(12) United States Patent
Grabarnik et al.

(10) Patent No.: US 7,904,547 B2
(45) Date of Patent: Mar. 8, 2011

(54) METHOD, SYSTEM, AND PROGRAM PRODUCT FOR OPTIMIZING MONITORING AND DISCOVERY SERVICES FOR A GRID COMPUTING ENVIRONMENT

(75) Inventors: Genady Y. Grabarnik, Scarsdale, NY (US); Moon J. Kim, Wappingers Falls, NY (US); Lev Kozakov, Stamford, CT (US); Yefim Haim Michlin, Nesher (IL); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 11/358,304

(22) Filed: Feb. 21, 2006

(65) Prior Publication Data

US 2006/0212512 A1    Sep. 21, 2006

(51) Int. Cl.
G06F 15/173    (2006.01)
(52) U.S. Cl. ......... 709/224; 709/203; 709/223; 370/252; 370/254; 370/442; 714/2; 714/3
(58) Field of Classification Search .................. 709/224, 709/203, 223; 714/2, 3; 370/252, 254, 256, 370/442
See application file for complete search history.

(56) References Cited

U.S. PATENT DOCUMENTS

| | | | |
|---|---|---|---|
| 5,548,724 A | 8/1996 | Akizawa et al. | |
| 5,659,786 A | 8/1997 | George et al. | |
| 5,784,702 A | 7/1998 | Greenstein et al. | |
| 5,790,886 A | 8/1998 | Allen | |
| 5,812,780 A | 9/1998 | Chen et al. | |
| 6,011,918 A | 1/2000 | Cohen et al. | |
| 6,058,416 A | 5/2000 | Mukherjee et al. | |
| 6,247,109 B1 | 6/2001 | Kleinsorge et al. | |
| 6,275,863 B1 | 8/2001 | Leff et al. | |
| 6,341,314 B1 | 1/2002 | Doganata et al. | |
| 6,487,493 B2 | 11/2002 | Uekawa et al. | |

(Continued)

FOREIGN PATENT DOCUMENTS

JP    2002312315    10/2002

(Continued)

OTHER PUBLICATIONS

Bela Bollabas et al., "Coupling Scale-Free and Classical Random Graphs", Internet Mathematics vol. 1, No. 2, dated 2003, pp. 215-225.

(Continued)

*Primary Examiner* — Thu Ha T Nguyen
(74) *Attorney, Agent, or Firm* — William E. Schiesser; Hoffman Warnick LLC (57) ABSTRACT

Under the present invention, a stability and updateability (SUP) ratio for a grid computing environment is generated. Thereafter, a size of a set (e.g., at least one) of scale free graphs for the grid computing environment is estimated. Then, based on at least one predetermined parameter such as a quantity of nodes in the grid computing environment, the set of scale free graphs is actually generated. Based on the set of scale free graphs a set of perturbed scale free graphs is generated. In one example, this may be accomplished using a preferential rewiring technique. This process is repeated for each of the monitoring and discovery services, which will yield at least two sets of perturbed scale free graphs. Using these sets of graphs, a set of monitoring and discovery service (MDS) topology graphs for the grid computing environment will be generated and deployed for optimization.

17 Claims, 8 Drawing Sheets

U.S. PATENT DOCUMENTS

| | | |
|---|---|---|
| 6,532,488 B1 | 3/2003 | Ciarlante et al. |
| 6,587,938 B1 | 7/2003 | Eilert et al. |
| 6,597,366 B1 | 7/2003 | Bennett et al. |
| 6,597,956 B1 | 7/2003 | Aziz et al. |
| 6,813,637 B2 | 11/2004 | Cable |
| 6,917,963 B1 | 7/2005 | Hipp et al. |
| 6,983,463 B1 | 1/2006 | Hunt |
| 7,089,299 B2 | 8/2006 | Chetuparambil et al. |
| 7,162,628 B2 | 1/2007 | Gentil et al. |
| 7,171,470 B2 | 1/2007 | Doyle et al. |
| 2001/0002455 A1 | 5/2001 | Uekawa et al. |
| 2001/0029519 A1 | 10/2001 | Hallinan et al. |
| 2002/0087621 A1 | 7/2002 | Hendriks |
| 2002/0129085 A1 | 9/2002 | Kubala et al. |
| 2003/0005109 A1 | 1/2003 | Kambhammettu et al. |
| 2003/0014604 A1 | 1/2003 | Nishio et al. |
| 2003/0046270 A1 | 3/2003 | Leung et al. |
| 2003/0046357 A1 | 3/2003 | Doyle et al. |
| 2003/0061399 A1 | 3/2003 | Wagener et al. |
| 2003/0120701 A1 | 6/2003 | Pulsipher et al. |
| 2003/0126265 A1 | 7/2003 | Aziz et al. |
| 2003/0131136 A1 | 7/2003 | Emerson et al. |
| 2003/0154239 A1 | 8/2003 | Davis et al. |
| 2003/0167320 A1 | 9/2003 | Perez |
| 2003/0208593 A1 | 11/2003 | Bharati et al. |
| 2003/0225851 A1 | 12/2003 | Fanshier et al. |
| 2004/0205206 A1 | 10/2004 | Naik et al. |
| 2004/0230795 A1 | 11/2004 | Armitano et al. |
| 2005/0021316 A1* | 1/2005 | Bollobas et al. ............ 703/2 |
| 2005/0086640 A1 | 4/2005 | Kolehmainen et al. |
| 2005/0108731 A1 | 5/2005 | Corell et al. |
| 2005/0160104 A1 | 7/2005 | Meera et al. |
| 2005/0198647 A1 | 9/2005 | Hipp et al. |
| 2006/0015849 A1 | 1/2006 | Polozoff |
| 2006/0069665 A1 | 3/2006 | Yamakawa et al. |
| 2006/0136908 A1 | 6/2006 | Gebhart et al. |
| 2006/0168567 A1 | 7/2006 | Kressin et al. |
| 2007/0058631 A1* | 3/2007 | Mortier et al. ............ 370/392 |

FOREIGN PATENT DOCUMENTS

| | | |
|---|---|---|
| WO | 9504968 A1 | 2/1995 |

OTHER PUBLICATIONS

Bela Bollobas et al., "Robustness and Vulnerability of Scale-Free Random Graphs", Internet Mathematics vol. 1, No. 1, dated 2002, pp. 1-35.

Alina Beygelzimer et al, "Improving Network Robustness by Edge Modification", IBM TJ Watson Research Center, dated Mar. 30, 2005.

Sheresh et al, "Distributed File System", Found at:Server Administrators Bible:Option Pack Edition, pulled from www.windowsitlibrary.com/content/405/25/1.html, dated 1999.

Drissi et al., U.S. Appl. No. 11/068,368, filed Feb. 28, 2005, Office Action dated Dec. 7, 2009, 21 pages.

Drissi et al., U.S. Appl. No. 11/068,368, filed Feb. 28, 2005, Office Action Communication dated Jun. 10, 2010, 26 pages.

Doganata et al., U.S. Appl. No. 11/365,373, filed Mar. 1, 2006, Office Action Communication dated Jan. 22, 2010, 22 pages.

Drissi, U.S. Appl. No. 11/068,368, Office Action Communication, Aug. 11, 2008, 16 pages.

Drissi, U.S. Appl. No. 11/068,368, Office Action Communication, Jun. 18, 2009, 20 pages.

Drissi, U.S. Appl. No. 11/068,368, Office Action Communication, Mar. 10, 2008, 16 pages.

Drissi, U.S. Appl. No. 11/068,368, Office Action Communication, Dec. 29, 2008, 16 pages.

Durham, U.S. Appl. No. 10/718,419, Office Action Communication, Apr. 6, 2006, 33 pages.

Durham, U.S. Appl. No. 10/718,419, Notice of Allowance & Fees Due, Feb. 21, 2007, 7 pages.

Durham, U.S. Appl. No. 10/718,419, Office Action Communication, Nov. 14, 2005, 27 pages.

Durham, U.S. Appl. No. 10/718,419, Office Action Communication, Aug. 9, 2006, 29 pages.

Doganata et al., U.S. Appl. 11/365,373, Office Action Communication, Aug. 19, 2009, 30 pages.

Ohkawa, "Provide a Facade Interface for Enterprise Web Services", IBM Japan, Jan. 6, 2004, 14 pages.

Doganata et al., U.S. Appl. No. 11/365,373 filed Mar. 1, 2006, Office Communication dated Aug. 5, 2010, 20 pages.

Sheresh et al., "Microsoft Windows NT Server Administrator's Bible: Option Pack Edition", Distributed File System, 4 pages, Chapter 1, Apr. 1999, retrieved in Nov. 2006.

Tatsubori et al., "A Bytecode Translator for Distributed Execution of Legacy Java Software", 2001, pp. 236-255, Lector Notes in Computer Science, Springer Verlag, Berlin, DE, vol. 2072.

Machado et al., "Enable Existing Applications for Grid", pp. 1-14, Jun. 22, 2004, URL: http://www.ibm.com/developerworks/grid/library/gr-exist/.

Hiren P. Patel, "Final Office Action", U.S. Appl. No. 11/365,373, Notification Date Nov. 26, 2010, 19 pages.

* cited by examiner

METHOD, SYSTEM, AND PROGRAM PRODUCT FOR OPTIMIZING MONITORING AND DISCOVERY SERVICES FOR A GRID COMPUTING ENVIRONMENT

CROSS-REFERENCE TO RELATED APPLICATIONS

This application is related in some aspects to commonly assigned U.S. application Ser. No. 10/718,419, entitled "COMPUTERIZED SYSTEM, METHOD AND PROGRAM PRODUCT FOR MANAGING AN ENTERPRISE STORAGE SYSTEM" filed Nov. 20, 2003 and herein incorporated by reference. The application is also related in some aspects to commonly assigned U.S. application Ser. No. 11/068,368 entitled "COMPUTERIZED SYSTEM, METHOD, AND PROGRAM PRODUCT FOR MANAGING APPLICATIONS IN A SHARED COMPUTER INFRASTRUCTURE" filed Feb. 28, 2005 and herein incorporated by reference.

FIELD OF THE INVENTION

In general, the present invention relates to grid computing environments. Specifically, the present invention relates to a method, system, and program product for optimizing monitoring and (resource) discovery services for a grid computing environment.

BACKGROUND OF THE INVENTION

Today's common web service architecture provides multiple services within a single infrastructure. Enterprises with common needs are also coming together to share infrastructure and business processes. An advantage of this approach is that each involved party pays only a fraction of the entire cost involved. The above-incorporated patent applications disclose a storage grid architecture that optimizes storage utilization by "gridifying" storage cells within a common environment/infrastructure. This type of structure not only provides redundancy, but also takes performance-based parameters such as storage capacity, user requirements, etc., into consideration when selecting a file sharing location.

A grid environment/infrastructure provides flexible, secure, coordinated resource sharing among a dynamic collection of individuals, institutions, etc. It is distinguished from conventional distributed (enterprise) computing by its focus on large-scale resource sharing, innovative applications, and, in some cases, high-performance orientation. The collection of individual resources and institutions that contribute resources to a particular grid, and/or use the resources in that grid, is referred to as a virtual organization and represents a new approach to computing and problem solving based on collaboration among multiple disciplines in computation and data-rich environments.

Unfortunately, none of the existing approaches addresses or resolves the conflict that exists between grid environment stability and updateability. That is, as nodes are added to the grid environment, stability is improved, while updateability becomes more difficult. Conversely, if the grid includes fewer nodes, updateability is made easier, while stability suffers.

In view of the foregoing, there exists a need to overcome one or more of the deficiencies in the existing art.

SUMMARY OF THE INVENTION

In general, the present invention provides a method, system, and program product for optimizing monitoring and (resource) discovery services for a grid computing environment. Specifically, under the present invention, a stability and updateability (SUP) ratio for the grid computing environment is generated. Thereafter, a size of a set (e.g., at least one) of scale free graphs for the grid computing environment is estimated. Then, based on at least one predetermined parameter such as a quantity of nodes in the grid computing environment, the set of scale free graphs is actually generated. Based on the set of scale free graphs, a set of perturbed scale free graphs is generated. As will be further described below, this is typically accomplished using a preferential rewiring technique. This process is repeated for each of the monitoring and discovery services, which will yield two sets of perturbed scale free graphs. Using these sets of graphs, a set of monitoring and discovery service (MDS) topology graphs for the grid computing environment will be generated and deployed for optimal service.

A first aspect of the present invention provides a method for optimizing monitoring and discovery services for a grid computing environment, comprising: generating a stability and updateability (SUP) ratio for the grid computing environment; estimating a size of a set of scale free graphs for the grid computing environment; generating the set of scale free graphs based on at least one predetermined parameter; generating a set of perturbed scale free graphs based on the set of scale free graphs; and repeating the above steps for each of the monitoring and discovery services to generate a set of monitoring and discovery service (MDS) topology graphs for the grid computing environment.

A second aspect of the present invention provides a system for optimizing monitoring and discovery services for a grid computing environment, comprising: a ratio estimator for generating a stability and updateability (SUP) ratio for the grid computing environment; a size estimator for estimating a size of a set of scale free graphs for the grid computing environment; a scale free graph generator for generating the set of scale free graphs based on at least one predetermined parameter; a random perturbation generator for generating a set of perturbed scale free graphs based on the set of scale free graphs; and a network generator for repeating the above steps for each of the monitoring and discovery services to generate a set of monitoring and discovery service (MDS) topology graphs for the grid computing environment.

A third aspect of the present invention provides a program product stored on a computer readable medium for optimizing monitoring and discovery services for a grid computing environment, the computer readable medium comprising program code for causing a computer system to perform the following steps: generating a stability and updateability (SUP) ratio for the grid computing environment; estimating a size of a set of scale free graphs for the grid computing environment; generating the set of scale free graphs based on at least one predetermined parameter; generating a set of perturbed scale free graphs based on the set of scale free graphs; and repeating the above steps for each of the monitoring and discovery services to generate a set of monitoring and discovery service (MDS) topology graphs for the grid computing environment.

A fourth aspect of the present invention provides a method for optimizing monitoring and discovery services for a grid computing environment, comprising: providing a computer infrastructure being operable to: generate a stability and updateability (SUP) ratio for the grid computing environment; estimate a size of a set of scale free graphs for the grid computing environment; generate the set of scale free graphs based on at least one predetermined parameter; generate a set of perturbed scale free graphs based on the set of scale free graphs; and repeat the above steps for each of the monitoring and discovery services to generate a set of monitoring and discovery service (MDS) topology graphs for the grid computing environment.

A fifth aspect of the present invention provides computer software embodied in a computer readable medium for optimizing monitoring and discovery services for a grid computing environment, the computer software comprising instructions for causing a computer system to perform the following steps: generating a stability and updateability (SUP) ratio for the grid computing environment; estimating a size of a set of scale free graphs for the grid computing environment; generating the set of scale free graphs based on at least one predetermined parameter; generating a set of perturbed scale free graphs based on the set of scale free graphs; and repeating the above steps for each of the monitoring and discovery services to generate a set of monitoring and discovery service (MDS) topology graphs for the grid computing environment.

A sixth aspect of the present invention provides a business method for optimizing monitoring and discovery services for a grid computing environment.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention provides a method, system, and program product for optimizing monitoring and (resource) discovery services for a grid computing environment. Specifically, under the present invention, a stability and updateability (SUP) ratio for the grid computing environment is generated. Thereafter, a size of a set (e.g., at least one) of scale free graphs for the grid computing environment is estimated. Then, based on at least one predetermined parameter such as a quantity of nodes in the grid computing environment, the set of scale free graphs is actually generated. Based on the set of scale free graphs, a set of perturbed scale free graphs is generated. As will be further described below, this is typically accomplished using a preferential rewiring technique. This process is repeated for each of the monitoring and discovery services, which will yield two sets of perturbed scale free graphs. Using these sets of graphs, a set of monitoring and discovery service (MDS) topology graphs for the grid computing environment will be generated and deployed for optimization.

The approach of the present invention improves efficiency and stability of the MDS Index Service by providing proper and theoretically solid graphs for grid topology. The efficiency of the distributed MDS Index Service is improved, due to more uniform load distribution provided by the proposed topology graph. The stability of the MDS Index Service is improved because the proposed topology graph is stable with respect to random node failure(s). One aspect of present invention is to provide duplicate caches—one for the monitoring service, another for the resource discovery service. The network represents a graph with special statistical properties, namely: it is stable under possible topology fluctuations or node failures; and it is fast to update.

As used herein, the following terms have the following meanings:

Stability—an average distance between two nodes for a given distribution of node failures.

Updateability—a loss function of write and read requests related to propagating and obtaining updates. Note, that when stability level is increased, updateability will suffer.

Figure 1:
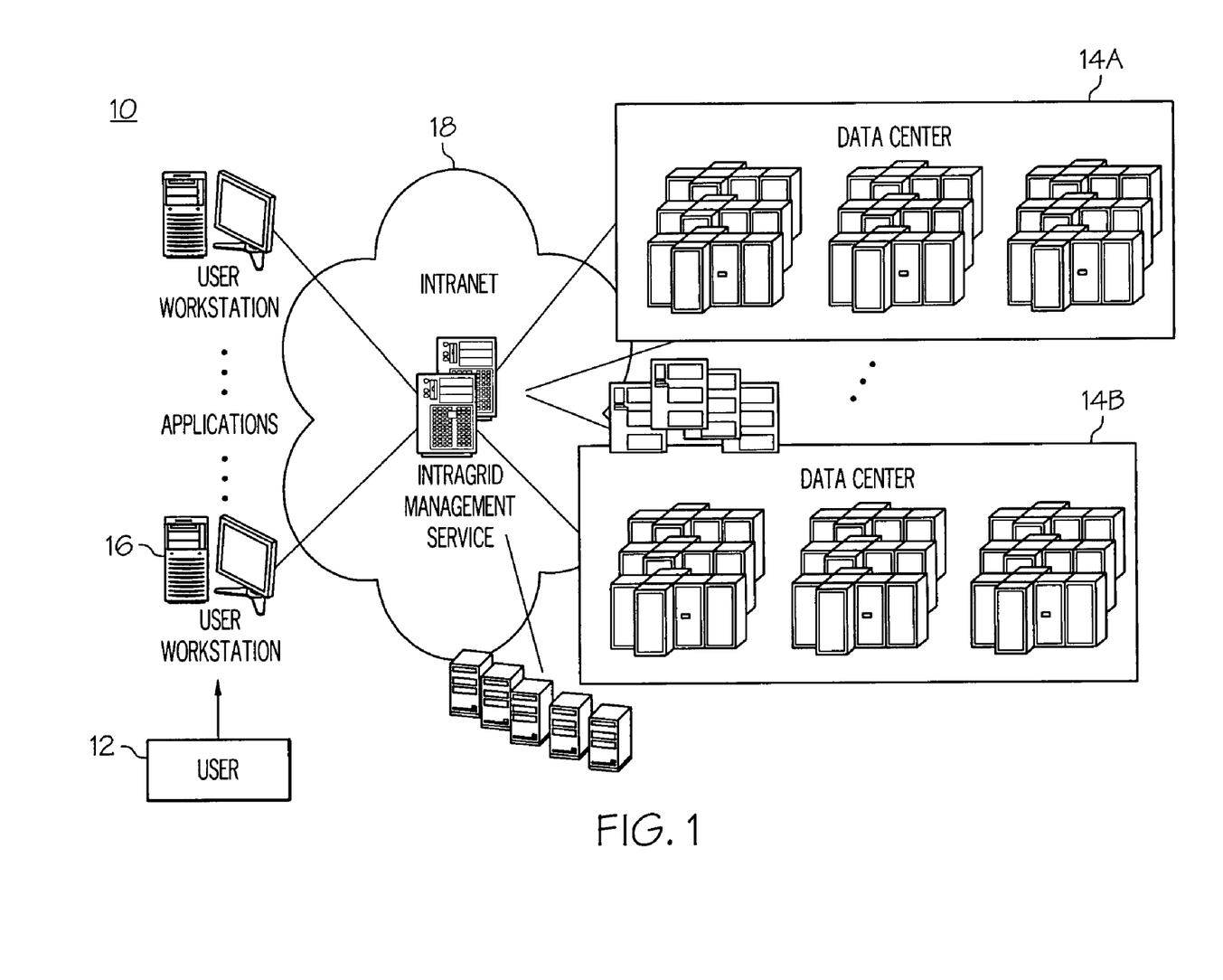
FIG. 1 depicts a grid computing environment in accordance with the present invention.
Figure 2:
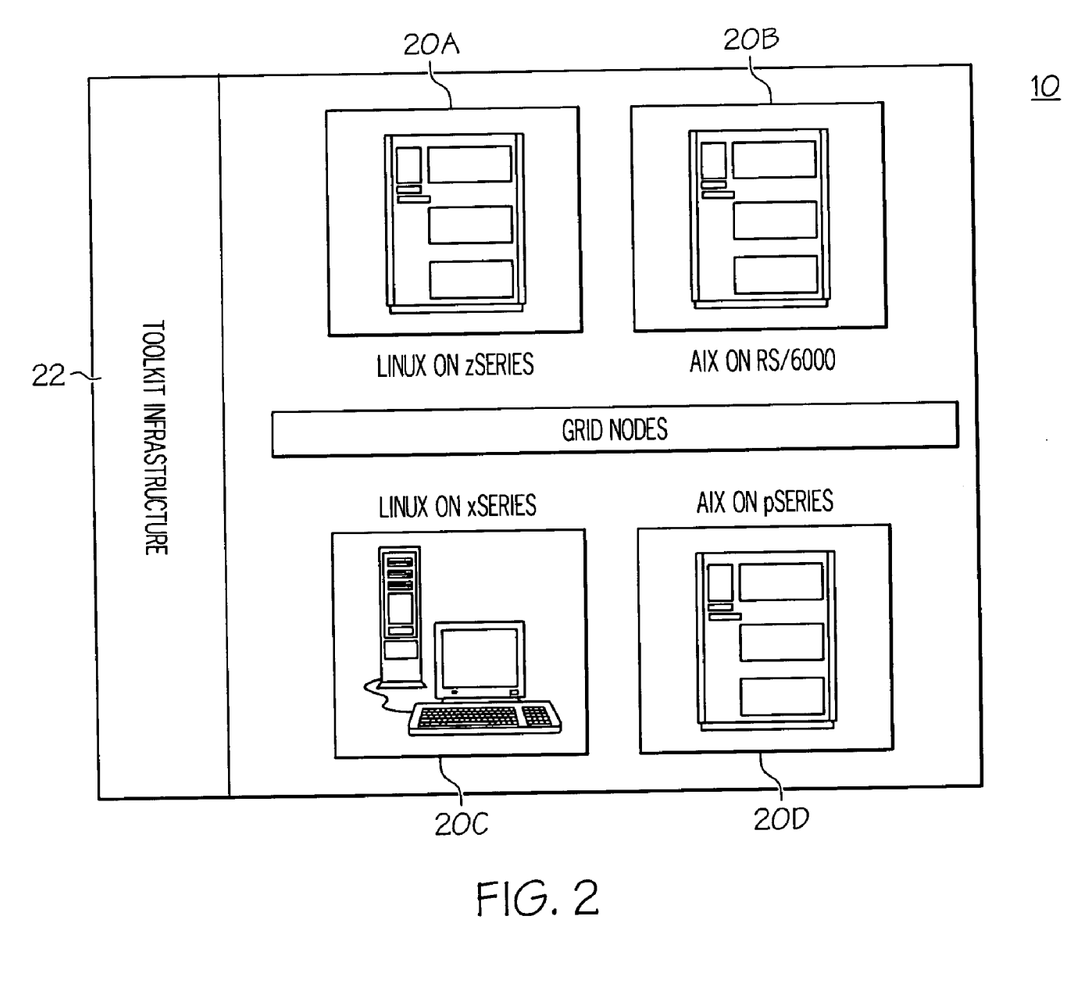
FIG. 2 depicts integration of different architectures in a grid computing environment in accordance with the present invention.

Referring now to FIG. 1, an illustrative grid computing environment 10 is shown. In general, grid computing environment 10 allows users such as user 12 to operate a workstation 16 to store files and the like in one or more data centers or "storage cells" 14A-B that are managed by management service 18. FIG. 2 illustrates the integration of different hardware architectures in a grid computing environment 10. As shown, nodes 20A-D, each of a different architecture, can be deployed in environment 10. As further shown, a toolkit infrastructure 22 such as (for example) the GLOBUS TOOLKIT infrastructure, which is an open source software toolkit developed by the Globus Alliance, can be deployed in environment 10.

Figure 3:
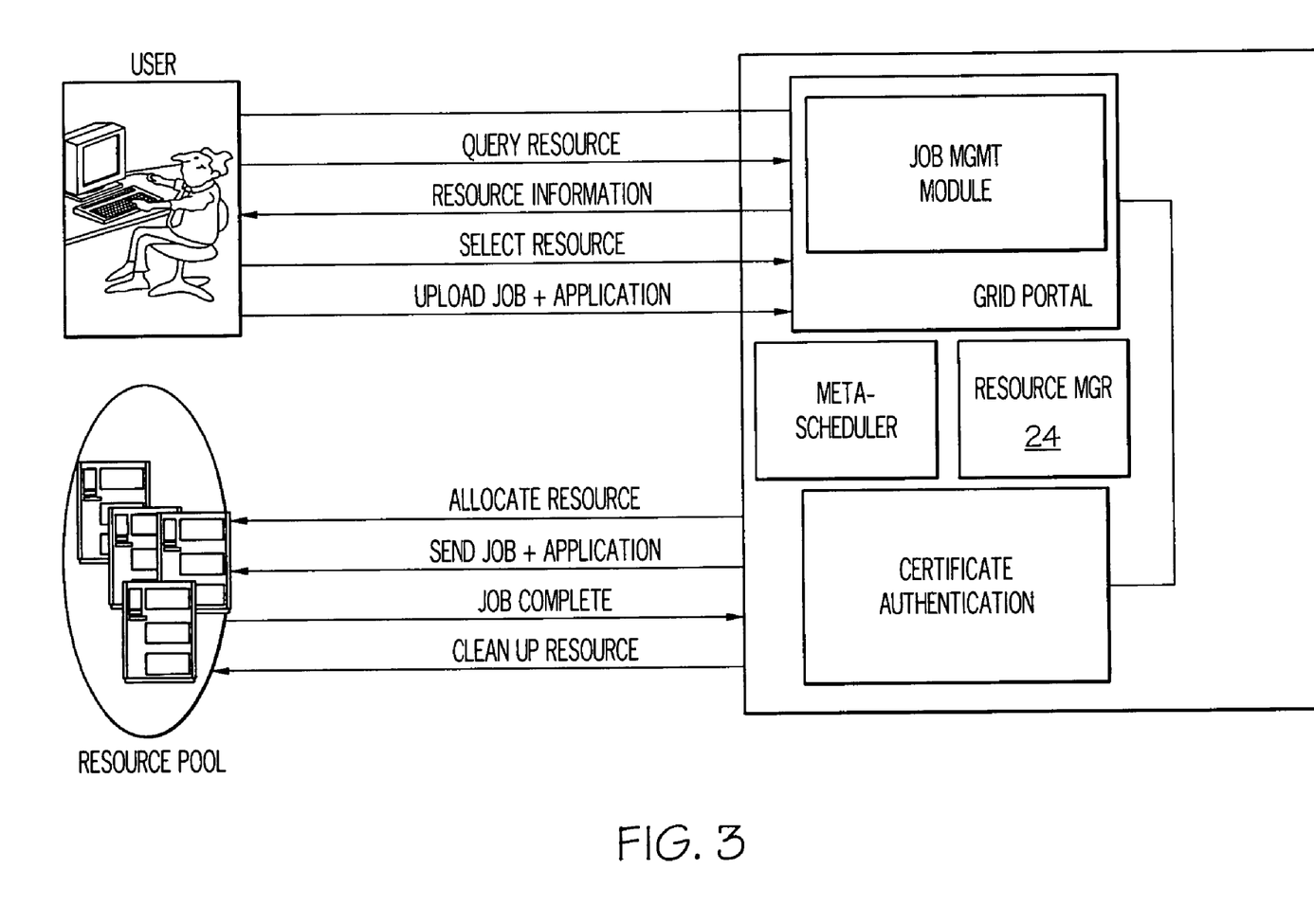
FIG. 3 depicts the controlling of grid resources in accordance with the present invention.

In general, grid resources are controlled by a grid resource manager 24, as illustrated in FIG. 3. For resource manager 24 to make informed decisions on resource assignments, resource manager 24 needs to know what grid resources are available, and their capacities and current utilization. This knowledge about the grid resources is maintained and provided by a Grid Information Service (GIS), also known as a Monitoring and Discovery Service (MDS). The MDS may be queried to discover the properties of the machines, computers, and networks such as the number of processors available at this moment, what bandwidth is provided, and the type of storage available.

Figure 4:
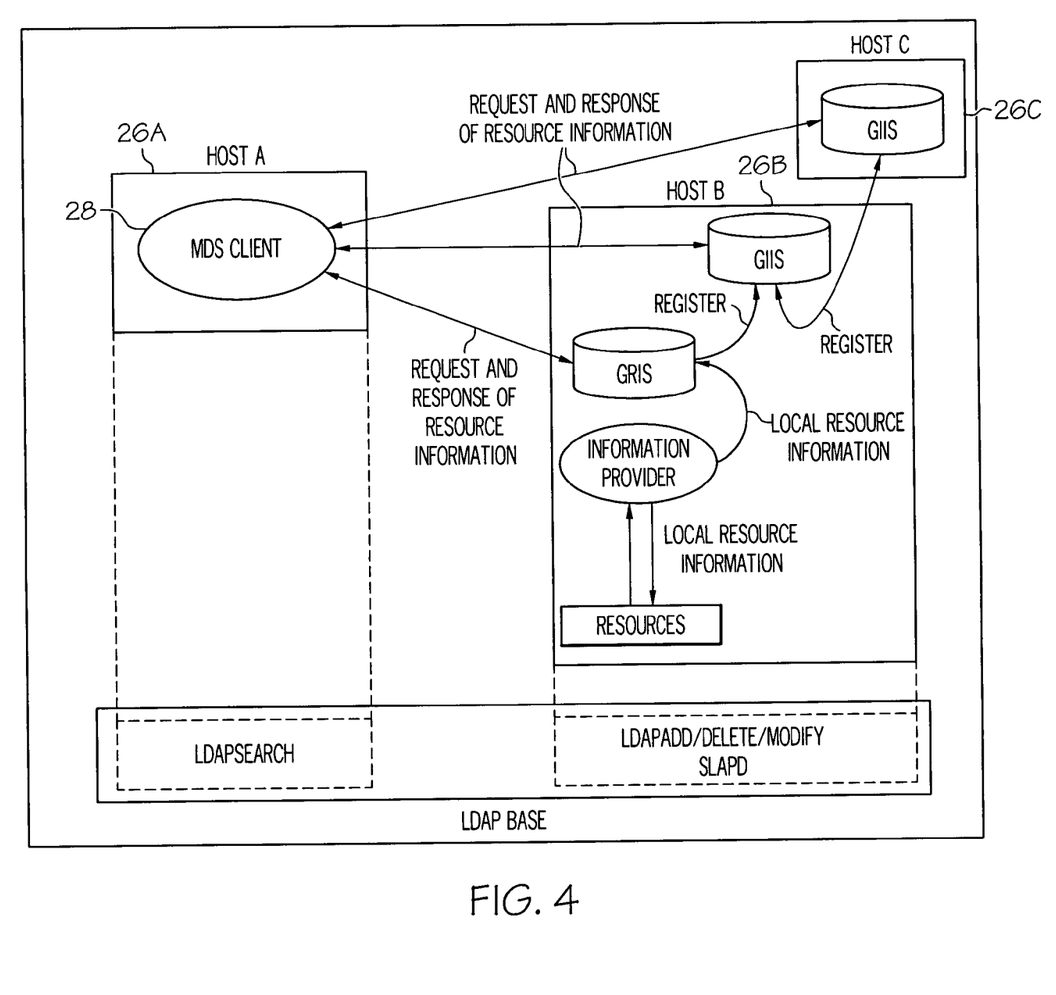
FIG. 4 depicts the organization of grid job scheduling in accordance with the present invention.

FIG. 4 illustrates organization of the grid job scheduling for different machines/platforms. As can be seen, requests and responses (of resource information) flow between each of the hosts 26A-C. As further shown, host 26A contains an MDS client 28 that provides MDS functions. The grid's MDS is an important service of the grid. Without this service, the whole idea of virtualizing resources and load becomes unrealizable. In many cases, due to the size of the grid, the following issues arise in MDS: (1) the necessity to maintain MDS stability under possible fluctuation/failures of the grid structure; and (2) the necessity to be able to promptly distribute information about changes in resource consumption and availability. It should be noted that similar problems are common to all highly distributed systems, including peer-to-peer (P-2-P) systems. Existing MDS implementations, based on LDAP, do not provide an efficient solution for these issues. One reason is that resource monitoring requires much more frequent information update than a typical LDAP implementation can provide. Existing grids' MDS are built upon an aggregation framework. The framework facilitates the building of the aggregating services (e.g., the Index, Trigger and Archive services). The Index Service, as the major service, obtains and caches information about availability and resource consumption of other services, and allows clients to query or subscribe to data. The Trigger Service subscribes to the Index Service. Upon arrival of notification, the Trigger Service checks certain preconditions. If preconditions hold, it executes some script (for example sends e-mail to an administrator). Archive Service stores historical monitoring data and enables queries against that data.

In any event, as will be further discussed below, the present invention yields an MDS or MDSNet topology graph based on sets of perturbed scale free graphs. Perturbed scale free graphs are generally known to be stable under uniformly distributed failures. In order to distribute the information transfer load more uniformly, the present invention provides a perturbed graph structure by randomizing a set of scale free graphs in such a way that the resulting graph provides the best information throughput for a given stability level. For a given stability and updateability (SUP) ratio, the perturbed scale free topology graph becomes optimal. As will be further described below, this procedure is repeated twice, building at least two sets of graphs, one set of graphs for the SUP ratio specific for the resource discovery service, and another set of graphs for the SUP ratio specific for the resource consumption monitoring service. The resulting topology graph will be used for the grid's MDS.

Figure 5:
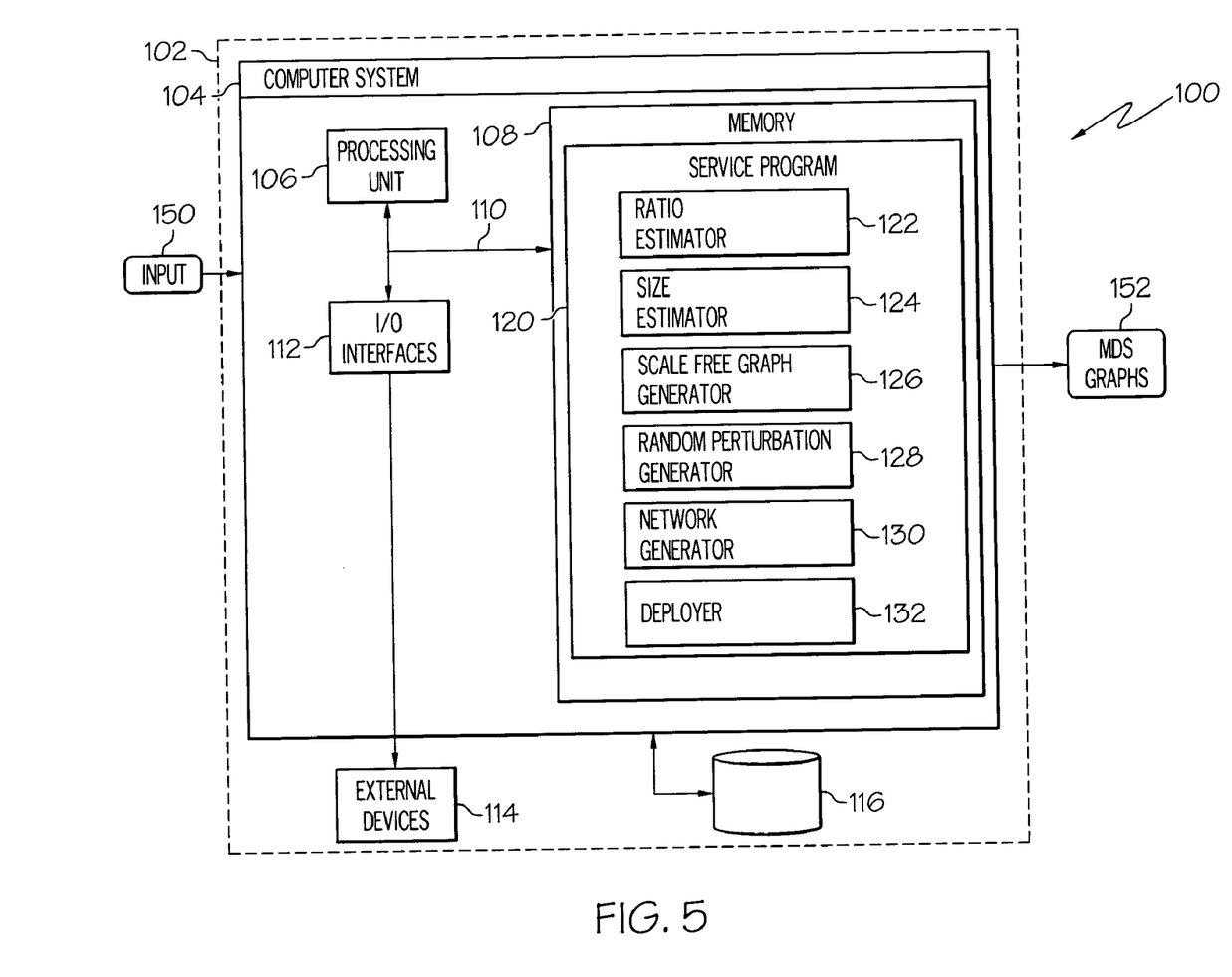
FIG. 5 depicts a computerized implementation in accordance with the present invention.

Referring now to FIG. 5, a computerized implementation 100 of the present invention is shown. As depicted, implementation 100 includes a computer system 104 deployed within a computer infrastructure 102, which could be a grid computing environment. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to deploy an application in a grid environment. In any event, as mentioned above, infrastructure 102 typically represents a grid computing environment in which computer system 104 is deployed.

As shown, computer system 104 includes a processing unit 106, a memory 108, a bus 110, and input/output (I/O) interfaces 112. Further, computer system 104 is shown in communication with external I/O devices/resources 114 and storage system 116. In general, processing unit 106 executes computer program code, such as service program 120, which is stored in memory 108 and/or storage system 116. While executing computer program code, processing unit 106 can read and/or write data to/from memory 108, storage system 116, and/or I/O interfaces 112. Bus 110 provides a communication link between each of the components in computer system 104. External devices 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process steps of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external devices 114. Still further, it is understood that one or more additional components (e.g., system software, math co-processing unit, etc.) not shown in FIG. 5 can be included in computer system 104. However, if computer system 104 comprises a handheld device or the like, it is understood that one or more external devices 114 (e.g., a display) and/or storage system(s) 116 could be contained within computer system 104, not externally as shown.

Storage system 116 can be any type of system (e.g., a database) capable of providing storage for information under the present invention such as historical data, graphs, etc. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown).

Figure 6:
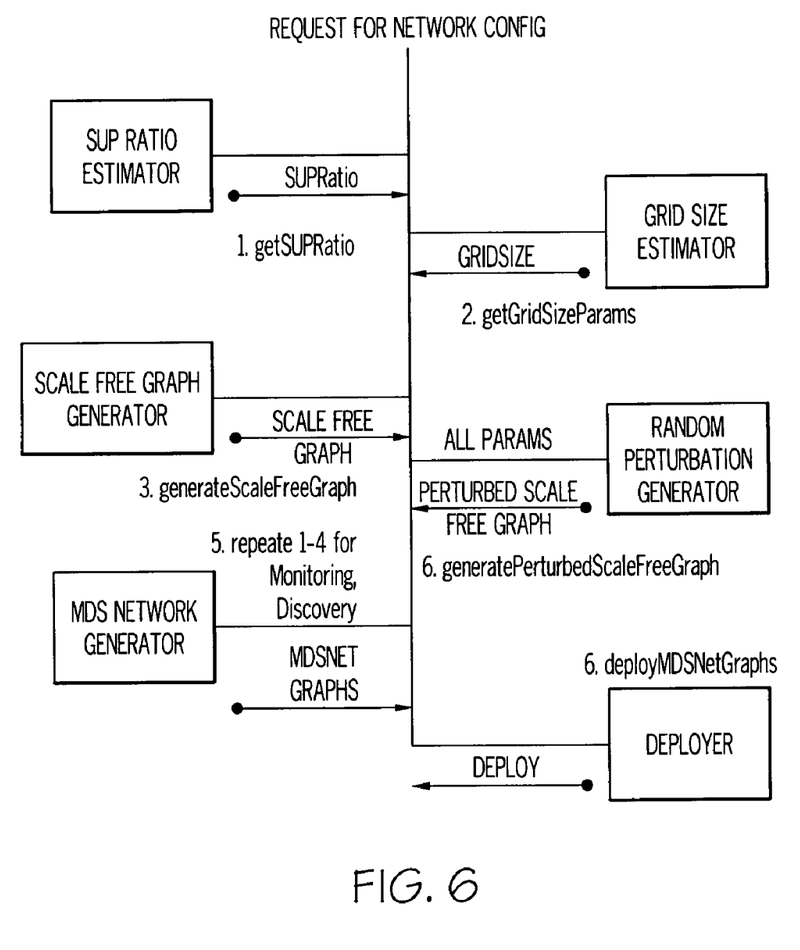
FIG. 6 depicts a flow diagram in accordance with the present invention.

Shown in memory 108 of computer system 104 is service program 120, which includes ratio estimator 122, size estimator 124, scale free graph generator 126, random perturbation generator 128, network generator 130, and deployer 132. The functions of these systems will be explained in conjunction with the flow diagram of FIG. 6. Thus, referring to FIGS. 5 and 6 collectively, the present invention functions as follows:

(SUP) ratio estimator 122 typically uses historical data of resource discovery (and/or some heuristic element) and monitoring requests for the existing grid computing environment topology to generate an SUP ratio. Specifically, the SUP ratio is generated by averaging over the size of the network, possible failures and, separately, requests for updates. For similar types of conditions, these values can be extrapolated based on the size of the graph (e.g., for two types of parameters—number of nodes and number of links). Ratio estimator 122 then generates the SUP ratio using extrapolation based on these two parameters and the average level read/write load. For an illustrative example, suppose that a grid includes 1000 nodes and 4000 links, and during thirty days twenty-five failures occurred. During the same period of time 500,000 updates occurred. In such circumstances, the value will be 500000*1/1000*1/(30*60*25). This value is extrapolated for all possible values of number of links.

Once the SUP ratio is generated, size estimator 124 initializes itself by performing numerical experiments in order to produce a function representing the relation between parameters of the graph and the failures/updates level. Then, it reverses this function using "spline" approximation, making it a function of the failures/updates level and error tolerance with values of graph parameters (number of nodes, number of links). The inverted function is used by size estimator 124 to estimate a size of a set of scale free graphs for the grid computing environment.

Thereafter, scale free graph generator 126 will generate a set of scale free graphs based on at least one predetermined parameter (e.g., a quantity of nodes, a quantity of links), using any known available algorithm.

Figure 7:
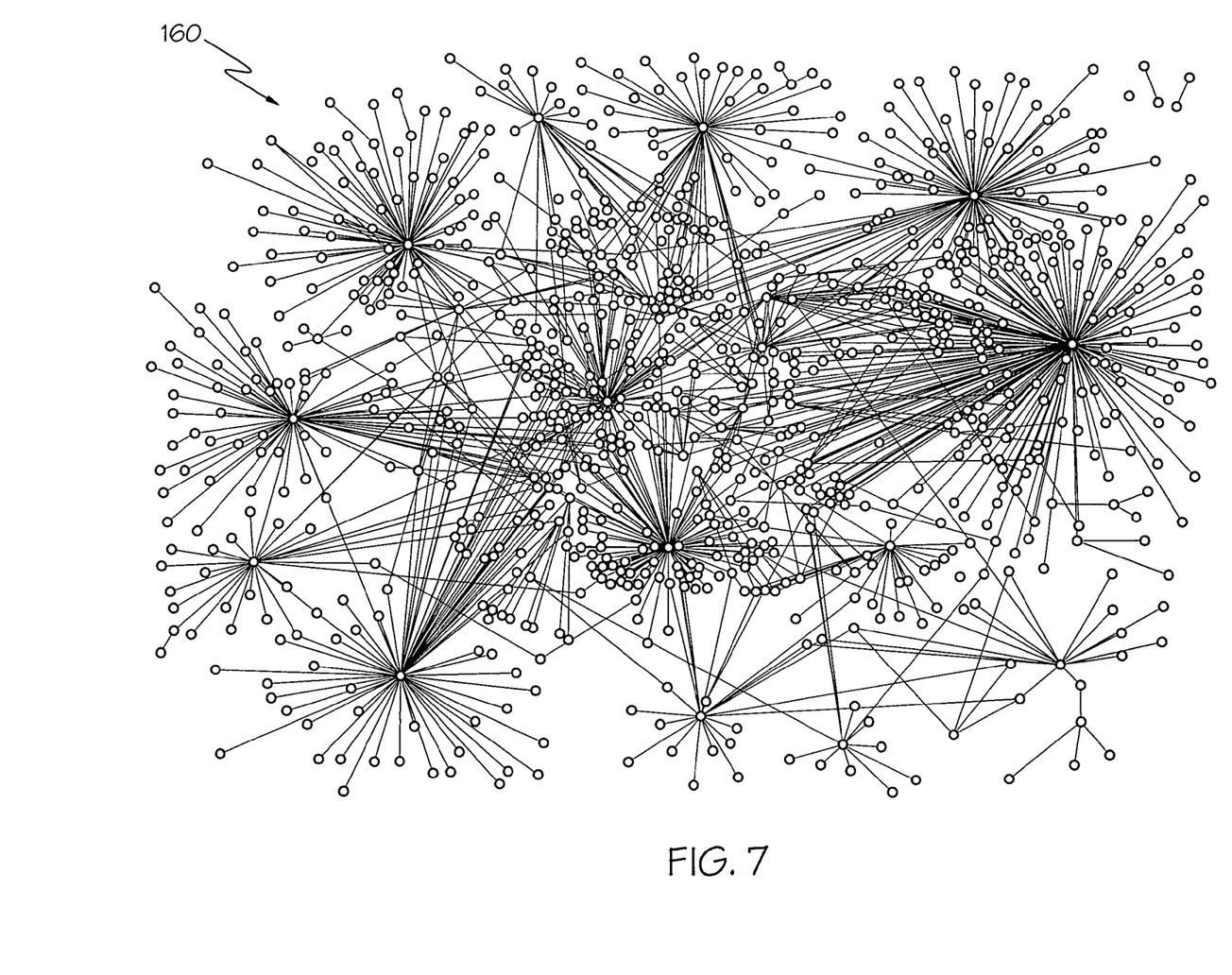
FIG. 7 depicts a scale free graph in accordance with the present invention.

The following algorithm represents one illustrative possibility:
1. For the first $m_o$ nodes;
2. Create a pool K and add to it $m_o$ initial nodes;
3. Create a pool L of all the other nodes;
4. Remove randomly a node 1 from the pool L and connect it to a randomly chosen node from the pool K;
5. Add node 1 to the pool K;
6. For the rest of the nodes;
7. Remove randomly a node i from the pool L;
8. Select randomly a vertex from the pool K and connect it with probability;
9. to the vertex I;

$$P(k_i) = \frac{k_i}{\sum_j k_j}$$

to the vertex I;
10. Add i to the pool K;

Referring to FIG. 7, an illustrative scale free graph 160 is shown.

As an illustration of scale free graphs, a financial structure is considered. Parts of the portfolios of different companies (e.g., those quoted in a stock exchange) include shares of other companies. The subset of those traded in the same stock exchange form a network: The vertices are the companies, and an oriented link is drawn only when an organization owns more than 5% of the other. The result, shown in FIG. 7, clearly illustrates the presence of a scale-free network.

Based on the set of scale free graphs, random perturbation generator 128 (FIG. 5) will utilize one of the possible perturbation schemas, for specificity below is outlined a number of perturbation schemas to generate a set of proper perturbed scale free graphs.

S1a: Random addition. Add a new edge by connecting two random nodes.
S1b: Preferential addition. Add a new edge by connecting two unconnected nodes having the lowest degrees in the network.
S2a: Random edge rewiring. Remove a random edge, then add an edge as in S1a.
S2b: Random neighbor rewiring. Choose a random node, and then a random neighbor of that node, and remove the corresponding edge. Then add an edge as in S1a.
S3a: Preferential rewiring. Disconnect a random edge from a highest-degree node, and reconnect that edge to a random node.
S3b: Preferential random edge rewiring. Choose a random edge, disconnect it from its higher-degree node, and reconnect that edge to a random node.

Figure 8:
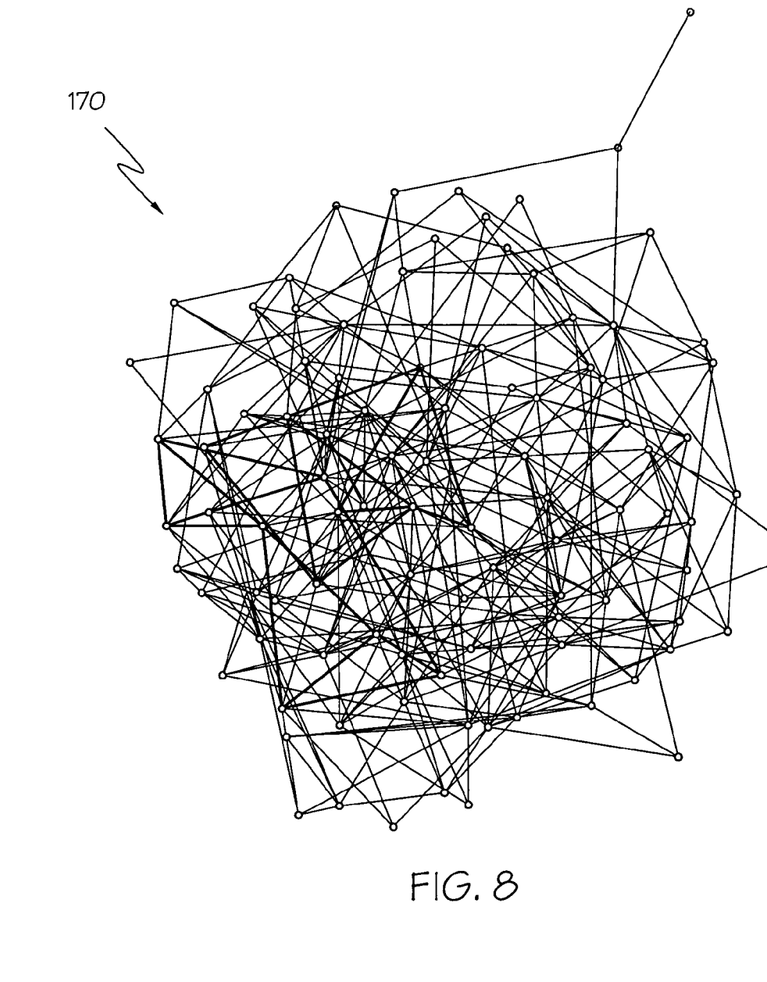
FIG. 8 depicts a perturbed scale free graph in accordance with the present invention.

Referring briefly to FIG. 8, an illustrated perturbed scale free graph 170 is depicted. Due to the choice of the parameters given above, random perturbation generator 128 (FIG. 5) creates the set of perturbed scale free graphs with the following properties: (a) it is stable for "small" random failures up to the degree chosen as a parameter during generation of the set of scale free graphs (e.g., 1% or 3% or 5% or 10% or 20%), since this graph is close to a scale free graph; and (b) it is easily updateable, since preferential rewiring makes the graph much more homogeneous.

Regardless, the above steps will be repeated for each of the monitoring and discovery services. The goal is to generate two sets of perturbed scale free graphs (e.g., one set for each service). Using the two sets of perturbed scale free graphs, network generator 130 will generate a set of MDSNet graphs (also referred to herein as a set of MDS topology graphs). Based on the set of MDS topology graphs, network generator 130 will generate distributed caches (one for each service), as follows: each node of the graph corresponds to the cache itself, and each link in the graph corresponds to a possibility of communication between caches.

Once the set of MDS topology graphs are generated, deployer 132 will deploy the same. To this end, deployer 132 can use a standard grid deployment mechanism, (e.g., OGSI) to deploy the set of MDS topology graphs. Using the set of MDS topology graphs, the monitoring and discovery services provided for the grid computing environment can be optimized.

While shown and described herein as a method, system, and program product for optimizing monitoring and (resource) discovery services for a grid computing environment, it is understood that the invention further provides various alternative embodiments. For example, in one embodiment, the invention provides a computer-readable/useable medium that includes computer program code to enable a computer infrastructure to optimize monitoring and (resource) discovery services for a grid computing environment. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 5) and/or storage system 116 (FIG. 5) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to optimize monitoring and (resource) discovery services for a grid computing environment. In this case, the service provider can create, maintain, support, etc., a computer infrastructure, such as computer infrastructure 102 (FIG. 5) that performs the process steps of the invention for one or more customers.

In return, the service provider can receive payment from the customer(s) under a subscription and/or fee agreement and/or the service provider can receive payment from the sale of advertising content to one or more third parties.

In still another embodiment, the invention provides a computer-implemented method for optimize monitoring and (resource) discovery services for a grid computing environment. In this case, a computer infrastructure, such as computer infrastructure 102 (FIG. 5), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 104 (FIG. 5), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method, executed on a computer device, for optimizing monitoring and discovery services for a grid computing environment, comprising:
    generating, on the computer device, a stability and updateability (SUP) ratio for the grid computing environment;
    estimating, on the computer device, a size of a set of scale free graphs for the grid computing environment using the SUP ratio;
    generating, on the computer device, the set of scale free graphs based on at least one predetermined parameter;
    generating, on the computer device, a set of perturbed scale free graphs based on the set of scale free graphs, wherein the set of perturbed scale free graphs are generated using a preferential rewiring technique; and
    repeating the above steps for each of the monitoring and discovery services to generate a set of monitoring and discovery service (MDS) topology graphs for the grid computing environment.

2. The method of claim 1, wherein the set of MDS topology graphs are generated based on sets of perturbed scale free graphs.

3. The method of claim 1, wherein the at least one predetermined parameter comprises a quantity of nodes in the grid computing environment.

4. The method of claim 1, wherein the SUP ratio is generated based on historical data.

5. The method of claim 1, further comprising deploying the set of MDS topology graphs.

6. The method of claim 1, further comprising optimizing the monitoring and discovery services using the set of MDS topology graphs.

7. A system for optimizing monitoring and discovery services for a grid computing environment, comprising:
    at least one computer device comprising:
        a ratio estimator for generating a stability and updateability (SUP) ratio for the grid computing environment;
        a size estimator for estimating a size of a set of scale free graphs for the grid computing environment using the SUP ratio;
        a scale free graph generator for generating the set of scale free graphs based on at least one predetermined parameter;
        a random perturbation generator for generating a set of perturbed scale free graphs based on the set of scale free graphs, wherein the set of perturbed scale free graphs are generated using a preferential rewiring technique; and
        a network generator for repeating the above steps for each of the monitoring and discovery services to generate a set of monitoring and discovery service (MDS) topology graphs for the grid computing environment.

8. The system of claim 7, wherein the set of MDS topology graphs are generated based on sets of perturbed scale free graphs.

9. The system of claim 7, wherein the at least one predetermined parameter comprises a quantity of nodes in the grid computing environment.

10. The system of claim 7, wherein the SUP ratio is generated based on historical data.

11. The system of claim 7, further comprising a deployer for deploying the set of MDS topology graphs.

12. A program product stored on a non-transitory computer readable storage medium for optimizing monitoring and discovery services for a grid computing environment, the non-transitory computer readable medium comprising program code for causing a computer system to perform the following steps:
    generating a stability and updateability (SUP) ratio for the grid computing environment; estimating a size of a set of scale free graphs for the grid computing environment using the SUP ratio;
    generating the set of scale free graphs based on at least one predetermined parameter;
    generating a set of perturbed scale free graphs based on the set of scale free graphs, wherein the set of perturbed scale free graphs are generated using a preferential rewiring technique; and
    repeating the above steps for each of the monitoring and discovery services to generate a set of monitoring and discovery service (MDS) topology graphs for the grid computing environment.

13. The program product of claim 12, wherein the set of MDS topology graphs are generated based on sets of perturbed scale free graphs.

14. The program product of claim 12, wherein the at least one predetermined parameter comprises a quantity of nodes in the grid computing environment.

15. The program product of claim 12, wherein the SUP ratio is generated based on historical data.

16. The program product of claim 12, the computer readable storage medium further comprising program code for causing the computer system to perform the following step: deploying the set of MDS topology graphs.

17. A method for optimizing monitoring and discovery services for a grid computing environment, comprising:
providing a computer infrastructure being operable to:
generate a stability and updateability (SUP) ratio for the grid computing environment;
estimate a size of a set of scale free graphs for the grid computing environment using the SUP ratio;
generate the set of scale free graphs based on at least one predetermined parameter;
generate a set of perturbed scale free graphs based on the set of scale free graphs, wherein the set of perturbed scale free graphs are generated using a preferential rewiring technique; and
repeat the above steps for each of the monitoring and discovery services to generate a set of monitoring and discovery service (MDS) topology graphs for the grid computing environment.

* * * * *